United States Patent
Ding

(10) Patent No.: US 8,015,166 B2
(45) Date of Patent: Sep. 6, 2011

(54) METHOD FOR CHARACTERISTIC CHARACTER STRING MATCHING BASED ON DISCRETENESS, CROSS AND NON-IDENTICAL

(76) Inventor: Guangyao Ding, Chengdu (CN)

( * ) Notice: Subject to any disclaimer, the term of this patent is extended or adjusted under 35 U.S.C. 154(b) by 142 days.

(21) Appl. No.: 12/377,722
(22) PCT Filed: Apr. 2, 2007
(86) PCT No.: PCT/CN2007/001061
§ 371 (c)(1), (2), (4) Date: Feb. 17, 2009
(87) PCT Pub. No.: WO2008/031306
PCT Pub. Date: Mar. 20, 2008

(65) Prior Publication Data
US 2010/0174728 A1    Jul. 8, 2010

(30) Foreign Application Priority Data

Sep. 8, 2006  (CN) .......................... 2006 1 0021787
Jan. 24, 2007 (CN) .......................... 2007 1 0006052

(51) Int. Cl.
G06F 7/00    (2006.01)
(52) U.S. Cl. ....................................... 707/702; 707/770
(58) Field of Classification Search .................. 707/706, 707/758
See application file for complete search history.

(56) References Cited

U.S. PATENT DOCUMENTS

| | | | | |
|---|---|---|---|---|
| 4,180,854 A | * | 12/1979 | Walden et al. ................. | 708/130 |
| 5,664,189 A | * | 9/1997 | Wilcox et al. ................. | 707/690 |
| 6,026,398 A | * | 2/2000 | Brown et al. ................. | 707/745 |
| 7,788,248 B2 | * | 8/2010 | Forstall et al. ................. | 707/706 |
| 2004/0107088 A1 | * | 6/2004 | Budzinski ........................ | 704/10 |
| 2005/0171746 A1 | * | 8/2005 | Thalhammer-Reyero ........ | 703/2 |
| 2007/0061735 A1 | * | 3/2007 | Hoffberg et al. .............. | 715/744 |

FOREIGN PATENT DOCUMENTS

CN    1538322 A    10/2004

OTHER PUBLICATIONS

Bao Zhengrong et al., A Fast Algorithm on String Cross Pattern Matching, vol. 37, No. 3, J. of Shanghai Jiaotong Univ., Mar. 2003 (see English Abstract).
Yin Lihua et al., An Improved Algorithm for Multiple Patterns Matching, vol. 33., Supp., J. Huazhong Univ. of Sci. & Tech. Dec. 2005 (see English Abstract).
Lu Xueqiang et al., Fast Hash Algorithms on Statistical Substring Reduction, J. of Fudan University, Oct. 2004 (see English Abstract).

* cited by examiner

Primary Examiner — James Trujillo
Assistant Examiner — Linh Black
(74) Attorney, Agent, or Firm — Mei & Mark LLP

(57) ABSTRACT

The present invention discloses a method for characteristic string matching based on discreteness, cross and non-completeness, comprising the steps of: A. a user setting discrete number, cross number and non-complete number in the user interface, or an information processing device automatically setting the discrete number, cross number and non-complete number, and inputting the retrieval keywords; B. the information processing device performing the characteristic string matching based on the three characters, with the discrete number, cross number and non-complete number set in step A as matching constraints, for a designated text according to the keywords input by user, and output the matching result of one of the eight retrieval modes, including precise retrieval, discrete retrieval, cross retrieval and cross and discrete retrieval, non-complete retrieval, discrete and non-complete retrieval, cross and non-complete retrieval, discrete and non-complete retrieval. With simple, flexible and convenient operations, the method consistent with the invention realizes a novel operation of information retrieval and provides eight information retrieval modes capable of qualitative retrieval, error tolerant retrieval, and automatic parameter setting retrieval.

10 Claims, 2 Drawing Sheets

METHOD FOR CHARACTERISTIC CHARACTER STRING MATCHING BASED ON DISCRETENESS, CROSS AND NON-IDENTICAL

FIELD OF THE INVENTION

The present invention relates to a method for characteristic string matching based on discreteness, cross and non-completeness, belonging to information retrieval (IR).

DESCRIPTION OF THE RELATED ART

As internet information technology develops rapidly, the internet information plays an important role in the information age. The information retrieval becomes popular and family-oriented with a bottleneck on the way the user performs the information retrieval. The character string matching, especially the non-precise string matching is the foundation of information retrieval, the importance of which is what an engine to a moving machine. The string matching is a critical technical bottleneck which directly affects the information retrieval in aspects of retrieval mode, retrieval function, retrieval effect and user interface, etc.

defined, but present a diversification, which is a typical problem-oriented phenomenon. For example, essentially, a substitution error can be qualitatively represented by an insertion error and a deletion error, while a swap error can be qualitatively illustrated by an insertion error and a deletion error. Theoretically, the classification method for string matching based on error factors is not perfect, which is one of the important reasons why the string matching has not developed a scientific classification system yet.

The most directly negative effect lies in that, the method based on error factors has difficulty in defining the concept, characteristic and range regarding the matching, and the choosing of a mode for a specific string matching becomes more complex. Therefore, the information retrieval can only be fuzzy, and has only a precise retrieval mode and a fuzzy retrieval mode (or non-precise retrieval mode).

(2) The polymorphism of the present string matching based on error factors directly affects the classification and quality of retrieval modes. The table below reflects the polymorphism of the description of specific problems based on error factors.

Table of the polymorphism of the description of specific problems based on the error factor:

| TEXT | MODE | DESCRIPTION BASED ON ERROR FACTORS |
|---|---|---|
| ABCDEFGH | ABCDEFGH | Precise matching (i.e. substring matching): no deletion, insertion, substitution and the like are permitted |
| ABCDEFGH | CDEF | Precise matching (i.e. substring matching): only prefix deletion and suffix deletion are permitted |
| ABCDEFGH | CDF | Non-precise matching:<br>1. one deletion(E) exists; or<br>2. several prefix deletions and suffix deletions exist and one intermediate deletion exists; or<br>3. one insertion (F) exists; or<br>4. one substitution (E, F) exists; etc. |
| ABCDEFGH | CEDF | Non-precise matching:<br>1. one swap (DE, ED) exists; or<br>2. two substitutions (D, E), (E, D) exist;<br>3. insertion (D) and deletion (D) exist; etc. |
| ABCDEFGH | CEFD | Non-precise matching:<br>1. one deletion (D) and one insertion (D) exist; or<br>2. two insertions (C), (D) exist; or<br>3. two insertions (E), (F) exist; etc. |
| ABCDEFGH | ACEFXD | Non-precise matching:<br>1. two deletions (B), (D) and two insertions exist (X), (D) exist; or<br>2. two deletions (B), (D) and two substitutions (G, X), (H, D) exist; etc. |

In recent forty years, the research, both at home and abroad on the non-precise string matching adopts the distance calculation based on error factors, and the Levenshtein Distance is the most common one, also known as ED (Edit Distance). There are some inherent problems on the distance calculation based on error-factor, simplifying the IR mode and further affecting the IR quality. The problems lie in the four aspects as follows:

(1) The research strategy of the present non-precise string matching based on the distance calculation of error factor is problem-oriented, such as insertion error, deletion error, substitution error, swap error and inverted error, etc. These problems are not completely independent and cannot be strictly In the above table, the quantification effect on the distance calculation is neglected, and, regarding the string matching based on error factors for specific texts and modes, there are a plurality of qualitative representations based on error factors reflecting the polymorphism of the description for the same problem which is not suitable for classification.

(3) The method for non-precise string matching based on the distance calculation of error factors fuzzes the characteristics of different error factors in matching by uniformly quantizing all the error factors through distance calculation, such as ED (Edit Distance). The distance only reflects the difference between the text and the mode in a specific error model, but can not reflect all the error phenomena, what error model the difference belongs to and where the error occurs, etc. Therefore, the measures for increasing the recall ratio, the precision ratio and the setting accuracy and the modes for qualitative and quantitative retrievals are less flexible and convenient.

(4) On the other hand, the non-precise string matching method based on the distance calculation of error factors considers only the negative effect of error factors on the precise matching, without mentioning the positive effect of error factors in application. For example, consistent with this patent application, the discreteness is no longer regarded as an error, but it is recognized that the discreteness has important applications in information retrieval. For example, in the information input, the discrete retrieval is used so that by default input the user can avoid the dialect error and the fuzzy pronunciation input and reduce the length of the input code, etc.; in the database retrieval and internet search engine, the discreteness is applied for the selection of keywords to perform the discrete retrieval and increase the recall ratio.

The above problems reflect an unsound string matching system, which directly affects the information retrieval in aspects of retrieval mode, retrieval function, retrieval effect and user interface, and results in a monotonous retrieval mode (precise and fuzzy), a bad retrieval quality, a low recall ratio, a diversity of matching methods and a difficult application. These problems need a solution badly.

SUMMARY OF THE INVENTION

The object of the present invention is to solve the above problems, and provides a method for characteristic string matching based on discreteness, cross and non-completeness, which method provides several information retrieval modes, with simple, flexible operation and powerful retrieval function.

The technical solution adopted by the present invention to solve the problems is a method for characteristic string matching based on discreteness, cross and non-completeness, comprising the steps:

Step A, setting characteristic parameters and inputting keywords, wherein the user sets in the User Interface (UI) or the information processing device automatically sets: a discrete number reflecting the discreteness, i.e. the number of discrete character in the keywords presented in the text; a cross number reflecting the cross, i.e. the number of cross character or substring in the keywords presented in the text; a non-complete number reflecting the non-completeness, i.e. the number of each character in the keywords not presented in the text; and inputs the keywords in the UI;

Step B, string matching and outputting, wherein the information processing device performs the string matching based on the three characteristics, with the discrete number, cross number and non-complete number set in step A as matching constraints, for a designated text according to the keywords input by user, and if the calculated practical discrete number, practical cross number and practical non-complete number satisfy the matching constraints, then output the matching result of one of the eight constraint modes combined by the three characteristic parameters.

Compared with the prior art, the advantage of the present invention is as follows:

A. The three characteristic parameters proposed by the invention, i.e. discreteness, cross and non-completeness with completely distinct natures and concepts are independent characteristics, and the research strategy of string matching based on the three characteristics more scientifically discloses the inherent law of string matching, and the error factors are the outward exhibitions of the three characteristics. The illustration can be made clearer by the example of comparison in the table below.

Table of the descriptions difference of specific problems between based on error factors and according to the present invention:

| TEXT | MODE | EXISTING DESCRIPTION BASED ON ERROR FACTORS | DESCRIPTION BASED ON THE THREE CHARACTERISTICS CONSISTENT WITH THE INVENTION |
|---|---|---|---|
| BCDEFGH | ABCDEFGH | Precise matching (i.e. substring matching): no deletion, insertion, substitution and the like are permitted | Precise matching(i.e. substring matching): no discreteness, cross and non-completeness are permitted |
| ABCDEFGH | CDEF | Precise matching (i.e. substring matching): only prefix deletion and suffix deletion are permitted | Precise matching (i.e., substring matching): no discreteness, cross and non-completeness are permitted |
| ABCDEFGH | CDF | Non-precise matching: 1. one deletion(E) exists; or 2. several suffix deletions and suffix deletions exist and one intermediate deletion exists; or 3. one insertion (F) exists; or 4. one substitution (E, F) exists; etc. | Discrete matching: only one discreteness (E) exists |
| ABCDEFGH | CEDF | Non-precise matching: 1. one swap (DE, ED) exists; or | Cross matching: Only one cross (D) exists |

-continued

| TEXT | MODE | EXISTING DESCRIPTION BASED ON ERROR FACTORS | DESCRIPTION BASED ON THE THREE CHARACTERISTICS CONSISTENT WITH THE INVENTION |
|---|---|---|---|
| ABCDEFGH | CEFD | 2. two substitutions (D, E), (E, D) exist; 3. insertion (D) and deletion (D) exist; etc. Non-precise matching: 1. one deletion (D) and one insertion (D) exist; or 2. two insertions (C), (D) exist; or 3. two insertions (E), (F) exist; etc. | Cross matching: only one cross (D) exists |
| ABCDEFGH | ACEFXD | Non-precise matching: 1. two deletions (B), (D) and two insertions(X), (D) exist; or 2. two deletions (B), (D) and two substitutions (G, X), (H, D) exist; etc. | Discrete Cross and non-complete matching:: One discreteness (B), one cross (D) and one non-completeness (X) exist |

Regarding the string matching based on error factors for specific texts and modes, it should be clear that there are a plurality of descriptions based on error factors reflecting the polymorphism of the description for the same problem, which is not suitable for detailed classification. And there is only one description for the same problem consistent with the present invention, reflecting accurately the matching for the texts and modes, so that the classification can be performed, accurately. There are two different descriptions based on error factors, regarding the two substrings matching in the above table; the present invention proposes only one description of the two substrings matching, which better conforms to the definition of substring. By the comparison in the above table, it is made clear that the difference between the discreteness and the deletion error, the difference between the cross and the substitution error and the difference between the non-completeness and the insertion error.

B. The combination of the three characteristics can strictly divide the IR mode into eight types, which provides the user eight IR modes to choose. The string matching based on the characteristics does not simply consider the characteristics as negative errors. For example, using the discrete retrieval, the default input of keywords by the user can avoid the dialect error and the fuzzy pronunciation input and can reduce the length of the input code, etc. The existing method for string matching based on the distance calculation of error factors cannot develop into a scientific classification system due to the replaceability of error factors. Therefore, the retrieval has only a precise mode and a fuzzy mode.

C. The present invention sets the value of the three characteristics as constraint parameters for string matching, and provides more flexible, qualitative and quantitative measures to increase the recall ratio, the precision ratio and the setting accuracy so as to satisfy the retrievals of different requirements and benefit the integrated consideration of recall ratio, precision ratio and setting accuracy for a specific problem and the arbitrary adjustment. The bigger the characteristic values are, the more relaxed the retrieval constraints are, along with a higher recall ratio; the smaller the characteristic values are, the stricter the retrieval constraints are, along with a higher precision ratio; the setting of a certain characteristic value to zero means the matching of that character is not permitted, thus, the selective qualitative and quantitative retrievals are performed by setting a certain characteristic value to zero, and the potential application of each characteristic in information retrieval is fully dug out, which is exactly an representation of the advantage of characteristic string matching.

D. A uniform integrated programming for string matching is performed to different retrieval modes, with one string matching program satisfying a specific characteristic information retrieval of the eight information retrieval modes. Each retrieval mode is just different in the input retrieval characteristic values, and the programmer needs not consider which method for string matching to perform different IR, but uniformly process the three characteristic values, so that it is more convenient to implement and popularize. To increase the matching efficiency, the independent research on the method for string matching is carried out for different models according to different constraint parameters, such as precise substring matching. Therefore, the strategy of characteristic string matching simplifies the string matching, straightens out the research on the method for string matching in such a manner that each string matching technology developed under the string matching system based on the three characteristics can be effectively utilized.

E. Unpredictable text errors resulted from various factors, such as transmission error, automatic recognition input error, storage error and the like will cause the omission of information retrieval, and some useful but faulty information cannot be retrieved. Consistent with the invention, the error tolerant retrieval can be realized by setting the discrete number, cross number and non-complete number properly.

F. When setting the characteristic parameters and inputting the keywords in step A, the UI can be a partial combination of the three characteristic parameters, which three characteristic parameters can be all or partly set by the user, or all set by the information processing device instead, thus forming a UI consisting of less than three or even no characteristic parameters. At this time, the characteristic parameters not presented in the UI are defaults set automatically on the basis of special uses. The combination of characteristic parameters in the UI can realize a retrieval mode with parameters automatically set, which is suitable for special applications and environments and reduces the number of characteristic parameters to set by the user. With convenient operation, the user only inputs the keywords and the less characteristic parameters.

The steps of the first algorithm for string matching and outputting in the above step B are as follows:

Step a, checking validity of input parameters:

Calculate length m of the keywords and length n of the text; check validity of the n, m, discrete number (DN), cross number (CN) and non-complete number (NCN), if invalid, then quit the matching, and return the unmatched results; otherwise, the cross number and non-complete number cannot exceed m−1, if exceeding, then altered to m−1;

Step b, loop initialization:

Set the sliding-window position (SWP) to 1, indicating the first position to process in the text;

Sort all the characters in keywords $p_1 p_2 \ldots p_m$ in ascending order, and store them in array PT which at the same time stores the original position of each character in the keywords. These two are respectively known as character subarray PTc stored in array PT and position subarray PTp stored in array PT;

From the beginning of the first character in the text, select a substring with a length of min (m+DN−1, n) as a sliding-window substring, add a special symbol smaller than any character ahead of the sliding-window substring, sort the characters in the sliding-window substring in ascending order, and store them in array WT which at the same time stores the original position of each character in the text, with the position of the special symbol being zero. These two are respectively known as character subarray WTc stored in array WT and position subarray WTp stored in array WT; min is a minimum function;

Step c, determining the termination of loop:

If (n−SWP+NCN)<m, then stop the process, and return the unmatched results;

Step d, proceeding to the parameter initialization for the next sliding-window substring matching:

From the beginning of the sliding-window position, select a substring with a length of min (m+DN−1, n) as a sliding-window substring, delete the minimum position (MinP) and the corresponding character stored in array WT, and then sort the end character in the sliding-window substring by insertion, which character is inserted in array WT, if (n−SWP+1)<(m+DN), then stop the insertion sort;

Initialize all values in array POS to −1, practical non-complete number to 0, array WT position W to 1, array PT position P to 1, maximum position (MaxP) to 0 and minimum position (MinP) to n;

Step e, determining whether or not the sliding-window substring matching is over:

If the comparison of array WT or the comparison of array PT is over, then go to step g;

Step f, loop comparison between the sliding-window substring and the characters in the keywords:

The following processes are respectively performed according to the comparison result between the character stored in position W of WTc and the character stored in position P of PTc:

If the character stored in position W of WTc is smaller than the character stored in position P of PTc, then add 1 to position W, and go to step e;

If the character stored in position W of WTp is bigger than the character stored in position P of PTp, then add 1 to position P, and add 1 to practical non-complete number; if the practical non-complete number is smaller or equal to the non-complete number, then go to step e, otherwise, add 1 to the sliding-window position, and go to step c;

If the character stored in position W of WTc is equal to the character stored in position P of PTc, then store the value stored in position W of WTp to array POS in position of the value stored in position P of PTp; If the value stored in position W of WTp is bigger than the maximum position (MaxP), then store the value stored in position W of WTp to the maximum position (MaxP);

If the value stored in position W of WTp is smaller than the minimum position (MinP), then store the value stored in position W of WTp to the minimum position (MinP); add 1 to position W, add 1 to position P, and go to step e;

Step g, determining whether or not the sliding-window substring satisfies the constraints:

Calculate the practical non-complete number (PNCN) by the equation of PNCN=(PNCN+m−P+1); if PNCN>NCN, then add 1 to the SWP, and go to step c;

Calculate the practical discrete number (PDN) by the equation of PDN=(MaxP−MinP+1−m+PNCN); if PDN>DN, then add 1 to SWP, and go to step c;

Calculate the practical cross number (PCN); if PCN>CN; then add 1 to SWP, and go to step c;

Step h, calculating the similarity:

$$\text{Similarity}=(2m-2\times\text{PNCN}-\text{PCN})\div(2m+\text{PDN}-\text{PNCN});$$

Step i, stopping the matching and return the following results:

the similarity, the array POS, the practical discrete number, the practical cross number and the practical non-complete number.

The string matching algorithm based on the characteristics automatically performs a uniform matching of eight information retrieval modes via one program by the values of discrete number, cross number and non-complete number, and returns the matching results satisfying different characteristic constraints, thus creating a standard integrated environment for information retrieval.

The returned similarity representing the matching degree of the text and the mode that satisfy the characteristic constraint is a real number from 0 to 1. For example, if the returned similarity is 0.50, it means that the similar degree of the substring matched between the mode and the text is 50%. The maximum similarity of all the retrieved texts is sorted and outputted for the user's selection. The returned array POS records the practical position of the matching. The returned practical discrete number, practical cross number and practical non-complete record the practical matching results of the matched sub-character sequence for the convenience of subsequent processes. The returned data can be organized into structured data and returned, or can be separately returned.

In the matching process, if the practical non-complete number does not satisfy the constraints, then immediately proceed to the next sliding-window matching, and only if the practical non-complete number and the practical discrete number satisfy the specific constraints, the practical cross number is calculated, and therefore the time complexity of the method is:

The average time complexity is approximate to O(nm+nd);

The worst case time complexity is O(nm+nd+nm Log$_2$(m)) ≈O(nm Log$_2$(m)).

The steps of the second algorithm for string matching and outputting in the above step B are as follows:

Step a, checking validity of input parameters:

Calculate length m of the keywords and length n of the text; check validity of the n, m, discrete number, cross number and non-complete number, if invalid, then quit the matching, and return null pointer results; otherwise, the cross number and non-complete number cannot exceed m−1, if exceeding, then altered to m−1;

Step b, loop initialization:

Set an OUT link with a node, which node contains the initial information as follows: MaxP=0, MinP=0 and similarity=1;

Set sliding-window position to 1, indicating the first position to process in the text;

Sort all the characters in keywords $p_1 p_2 \ldots p_m$ in ascending order, and store them in array PT which at the same time stores the original position of each character in the keywords. These two are respectively known as character subarray PTc stored in array PT and position subarray PTp stored in array PT;

From the beginning of the first character in the text, select a substring with a length of min (m+DN−1, n) as a sliding-window substring, add a special symbol smaller than any character ahead of the sliding-window substring, sort the characters in the sliding-window substring in ascending order, and store them in array WT which at the same time stores the original position of each character in the text, with the position of the special symbol being zero. These two are respectively known as character subarray WTc stored in array WT and position subarray WTp stored in array WT; min is a minimum function;

Step c, determining the termination of loop:

If (n−SWP+1+NCN)<m, then delete the head node in the OUT link, quit the matching and return the OUT link;

Step d, proceeding to the parameter initialization for the next sliding-window substring matching:

From the beginning of the sliding-window position, select a substring with a length of min (m+DN, n−SWP+1) as a sliding-window substring, delete the minimum position (MinP) and the corresponding character stored in array WT, and then sort the last character in the sliding-window substring by insertion, which character is inserted in array WT, if (n−SWP+1)<(m+DN), then stop the insertion sort;

Initialize all the values in array POS to −1, and practical non-complete number to 0, array WT position W to 1, array PT position P to 1, maximum position (MaxP) to 0 and minimum position (MinP) to n;

Step e, determining whether or not the sliding-window substring matching is over:

If the comparison of array WT or the comparison of array PT is over, then go to step g;

Step f loop comparison between the sliding-window substring and the characters in keywords:

The following processes are respectively performed according to the comparison result between the character stored in position W of WTc and the character stored in position P of PTc:

If the character stored in position W of WTc is smaller than the character stored in position P of PTc, then add 1 to position W, and go to step e;

If the character stored in position W of WTp is bigger than the character stored in position P of PTp, then add 1 to position P, and add 1 to practical non-complete number; if the practical non-complete number is smaller or equal to the non-complete number, then go to step e, otherwise, add 1 to the sliding-window position, and go to step c;

If the character stored in position W of WTc is equal to the character stored in position P of PTc, then store the value stored in position W of WTp to array POS in the position of the value stored in position P of PTp;

If the value stored in position W of WTp>maximum position (MaxP), then store the value stored in position W of WTp to maximum position (MaxP);

If the value stored in position W of WTp<minimum position (MinP), then store the value stored in position W of WTp to minimum position (MinP); add 1 to position W, add 1 to position P, and go to step e;

Step g, determining whether or not the sliding-window substring satisfies the constraints:

Calculate the practical non-complete number by the equation of PNCN=(PNCN+m−P+1); if PNCN>NCN, then add 1 to SWP, and go to step c;

Calculate the practical discrete number by the equation of PDN=(MaxP−MinP+1−m+PNCN); if PDN>DN, then add 1 to SWP, and go to step c;

Calculate the practical cross number (PCN); if PCN>CN; then add 1 to SWP, and go to step c;

Step h, calculating the similarity:

$$\text{Similarity}=(2m-2\times PNCN-PCN)\div(2m+PDN-PNCN);$$

Step i, inserting the matching results to the OUT link:

Add 1 to sliding-window position; combine the similarity, the maximum position, the minimum position, the array POS, the practical discrete number, the practical cross number and the practical non-complete number into a new node;

If the minimum position in the new node is bigger than the maximum position in the end node of the OUT link), then directly insert the new node to the end of the OUT link, and go to step c;

If the minimum position in the new node is smaller or equal to the maximum position in the end node of the OUT link and the similarity of the new node is bigger than the similarity of the end node in the OUT link, then substitute the end node in the OUT link with the new node, and go to step c; otherwise, abandon the new node, and go to step c.

The steps of the second algorithm for string matching calculation are basically the same with the steps of the first algorithm with only difference in:

In order to adapt the full-text retrieval, if the parameter requirements in step a are not satisfied, a null pointer is returned, indicating there is no matching substring; an OUT link is added in step b to record all the non-overlapping substrings satisfying the matching constraints and the corresponding information in the text; correspondingly, the OUT link is output in step c, instead of the unmatched results; and the OUT link is modified in step i according to the matching results. In the matching, there are probably two or more than two overlapping substrings satisfying the constraints, and the solution is that, for the two or more than two overlapping substrings, the substring with a larger similarity is output. The matching result of the overlapping string is selected based on the similarity so as to increase the setting accuracy.

If the returned OUT link is null, it indicates the substrings are unmatched, otherwise the OUT link contains all the matched substrings, and each containing the similarity, the maximum position, the minimum position, the array POS, the practical discrete number, the practical cross number and the practical non-complete number.

Therefore, besides all the benefits of the first algorithm, the second algorithm provides the IR user integrated and detailed matching information for the keywords in a specific text, and gives the most complete reference information for users' selection.

The time complexity of the method is as follows:

The average time complexity is approximate to O(nm+nd);

The worst case time complexity is O(nm $\log_2(m)$).

The first algorithm for calculating the practical cross number in the above step g is as follows:

Step (1), initialization: array LPOS is supposed to store a maximum interval ascending sequence, and the value at the first position of array LPOS is initialized to −1, LP is used to indicate the position of the array LPOS being processed and is initialized to 1; an end mark is added to the end of array POS, and the first value in array POS is extracted to the comparison data;

Step (2), determining the termination: if the comparison data is an end mark, then go to step (4);

Step (3), loop process: cope with the three conditions by comparison;

If the comparison data is larger than the data at LP position in array LPOS, then LP is increased by 1, and the comparison data is stored in LP position in array LPOS, the next value in array POS is extracted to the comparison data, and go to step (2);

If the comparison data is smaller than the data at LP position in array LPOS, then the search is carried out backward from the first position in array LPOS, and the first data larger or equal to the comparison data is searched out and modified by the comparison data, the next value in array POS is extracted to the comparison data, and go to step (2);

If the comparison data is equal to the data at LP position in array LPOS, then the next value in array POS is extracted to the comparison data, and go to step (2);

Step (4), obtaining the practical cross number: PCN=m−PNCN−LP+1.

This is a method for calculating cross number based on character unit.

In the matching process, array POS is used to store the positions of the matched characters in the keywords presented in the text, and the data in array POS is characterized in that, except value −1, other data is unequal integers larger than 0, the length of the maximum interval ascending sequence in array POS is defined in such a manner that a maximum interval ascending sequence is found out in array POS according to position order of the data in array POS, and the data number of that sequence is the length of maximum interval ascending sequence. Since indicating the unmatched characters, the value −1 is not counted into the maximum interval ascending sequence.

When the text and mode are matched, the practical cross number can be figured out by the length of the maximum interval ascending sequence. Therefore the practical cross number is precisely figured in this way, and is compared with the set cross number so as to pick out the text satisfying the cross number constraint and illustrate the cross matching status between the keywords and the specific text, which conveniently and flexibly satisfy the user's retrieval request. Another function of the cross number is to cooperate with the discrete number and non-complete number to calculate the similarity, which benefits the sorting of the retrieved texts or the selection of the matching results and satisfies the user's retrieval requirement.

The time complexity of the algorithm is: $O(m \log_2(m))$.

The second algorithm for calculating the practical cross number in the above step g is as follows:

Step (1), initialization: set the maximum continuous sequence length (MCSL) to 0, the current continuous sequence length (CCSL) to 1 and the sum of continuous subsequent integers to 0; all the values larger than zero in array POS are stored in a temporary array in turn, and an end mark is added to the end of the temporary array; if the number of nonzero elements in the temporary array is less than 1, then directly return the result of cross number=0; otherwise, array LPOS stores the maximum interval ascending sequence, and the value at the first position of the LPOS is initialized to the first value of the temporary array; LP is used to indicate the position of the array LPOS being processed and is initialized to 1; the second value in the temporary array is extracted to the comparison data;

Step (2), determining the termination: if the comparison data is an end mark, then go to step (5);

Step (3), performing the continuous process: if the comparison data is equal to the data in the prior position after decreasing by 1, then CCSL is increased by 1, the sum of continuous subsequent integers (SCSI) is increased by 1, and go to step (4); otherwise, the larger one of the current continuous sequence length and the maximum continuous sequence length is restored in the maximum continuous sequence length, the current sequence length is 1;

Step (4), coping with the two conditions by comparison

If the comparison data is larger than the data at LP position in array LPOS, then LP is increased by 1; the comparison data is stored in LP position in array LPOS, and the next value in the temporary array is extracted to the comparison data, and go to step (2);

If the comparison data is smaller than the data at LP position in array LPOS, then the search is carried out backward from the first position in array LPOS, and the first data larger than the comparison data is searched out and modified by the comparison data, the next value in the temporary array is extracted to the comparison data, and go to step (2);

Step (5), PCN=m−PNCN−LP−SCSI+Max(MCSL, CCSL)−1, wherein Max is a maximum function.

The second algorithm is an improvement on the first, known as a cross number algorithm based on substring unit, that is, when one substring intersects integrally in the model, it counts as one cross; while the cross number of the first algorithm is the length of the substring. The reason for this improvement is that, when one substring intersects integrally in the model, the entire substring is considered as a meaningful structured substring, for example, the integral cross between two English words is counted as one cross. The improved process is more practical for retrieval, such that the similarity of the integral cross is obviously higher than that of the first algorithm, and furthermore, preferred by the user, the output similarity is more consistent with practical requirements.

The time complexity of the algorithm is: $O(m \log_2(m))$.

When the characteristic parameters are set in the above step A, if the characteristic parameters are set by user, the UI has corresponding value input boxes for the user setting characteristic parameters.

The aforementioned input boxes in the UI are simply the value input boxes or combo boxes, and around each of the value input boxes, the corresponding characteristic parameter name is shown.

When the keywords are input in the above step A, the UI has a text box for the user inputting keywords.

When the characteristic parameters have been set in the above step A, according to the discrete number, cross number and non-complete number set by the user in the UI or automatically set by the information processing device, the information processing device determines the IR belongs to which one of the eight retrieval modes including the precise retrieval, discrete retrieval, cross retrieval, discrete and cross retrieval, non-complete retrieval, discrete and non-complete retrieval, cross and non-complete retrieval and discrete non-complete retrieval, and provides the retrieval mode name on the UI.

The UI of this provides a flexible, convenient, simple and easy operation mode in such a manner that the name of the corresponding information retrieval mode can be automatically displayed by setting different values of the characteristic parameters for the user's selection, and meanwhile, the values in the input boxes also represent the constraints for information retrieval. Therefore, different qualitative and quantitative information retrievals are performed by setting different characteristic parameters. The notice information on the UI is obvious and direct so that even the user is easy to operate without special training.

The invention will be described in detail with reference to the accompanying drawings and specific embodiments.

DETAILED DESCRIPTION OF THE EMBODIMENTS

Example 1

The first embodiment of the invention is a method for characteristic string matching based on discreteness, cross and non-completeness, comprising the steps of:

Step A, setting characteristic parameters and inputting keywords, wherein the user sets in the UI or the information processing device automatically sets: a discrete number reflecting the discreteness, i.e. the number of discrete character in the keywords presented in the text; a cross number reflecting the cross, i.e. the number of cross character or the substring in the keywords presented in the text; a non-complete number reflecting the non-completeness, i.e. the number of each character in the keywords not presented in the text; and inputs the keywords in the UI;

Step B, string matching and inputting, wherein the information processing device performs the string matching based on the three characteristics, with the discrete number, cross number and non-complete number set in step A as matching constraints, for a designated text according to the keywords input by user, and if the calculated practical discrete number, practical cross number and practical non-complete number satisfy the matching constraints, then output the matching result of one of the eight constraints combined by the three characteristic parameters.

Figure 1:
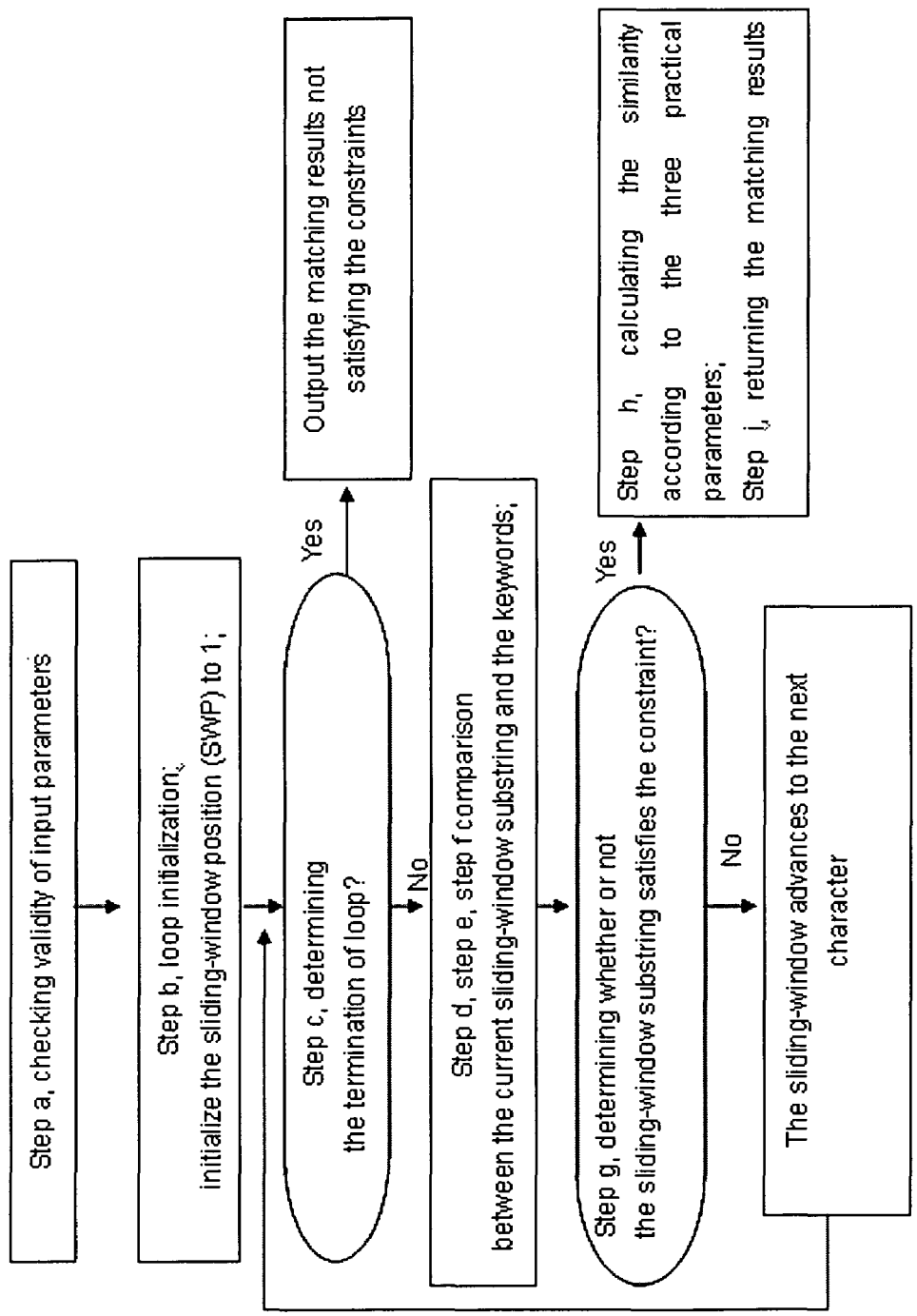
FIG. 1 is a schematic flow for the string matching and outputting in example 1 consistent with the invention.

The flow diagram of FIG. 1 is a schematic flow for string matching and outputting in step B of this example. FIG. 1 illustrates the flow in general: step a, checking validity of input characteristic parameters; step b, loop initialization: initialize the sliding-window position to 1, the sliding-window length=keywords length+DN; step c, determining the termination of loop, if the loop is terminated, then the matching results not satisfying the constraints are output, otherwise implement the following step d, step e and step f, and the current sliding-window substring is compared with the keywords; step g, calculating the practical discrete number, practical cross number, practical non-complete number, and determine whether or not the characteristic constraints are satisfied. If not, then the sliding-window advances to the next character, and go to step c; otherwise, implement step h, calculating the similarity according the three practical characteristic parameters; and step i, returning the matching results satisfying the characteristic constraints.

The complete procedure of string matching and outputting in step B of the example is as follows:

Step a, checking validity of input parameters:

Calculate length m of the keywords and length n of the text; check validity of the n, m, discrete number (DN), cross number (CN) and non-complete number (NCN), if invalid, then quit the matching, and return the unmatched results; otherwise, the cross number and non-complete number cannot exceed m−1, if exceeding, then altered to m−1;

Step b, loop initialization:

Set the sliding-window position (SWP) to 1, indicating the first position to process in the text;

Sort all the characters in keywords $p_1 p_2 \ldots p_m$ in ascending order, and store them in array PT which at the same time stores the original position of each character in the keywords. These two are respectively known as character subarray PTc stored in array PT and position subarray PTp stored in array PT;

From the beginning of the first character in the text, select a substring with a length of min (m+DN−1, n) as a sliding-window substring, add a special symbol smaller than any character ahead of the sliding-window substring, sort the characters in the sliding-window substring in ascending order, and store them in array WT which at the same time stores the original position of each character in the text, with the position of the special symbol being zero. These two are respectively known as character subarray WTc stored in array WT and position subarray WTp stored in array WT; min is a minimum function;

Step c, determining the termination of loop:

If (n−SWP+NCN)<m, then stop the process, and return the unmatched results;

Step d, proceeding to the parameter initialization for the next sliding-window substring matching:

From the beginning of the sliding-window position, select a substring with a length of min (m+DN−1, n) as a sliding-window substring, delete the minimum position (MinP) and the corresponding character stored in array WT, and then sort the end character in the sliding-window substring by insertion, which character is inserted in array WT, if (n−SWP+1) <(m+DN), then stop the insertion sort;

Initialize all values in array POS to −1, practical non-complete number to 0, array WT position W to 1, array PT position P to 1, maximum position (MaxP) to 0 and minimum position (MinP) to n;

Step e, determining whether or not the sliding-window substring matching is over:

If the comparison of array WT or the comparison of array PT is over, then go to step g;

Step f, loop comparison between the sliding-window substring and the characters in the keywords:

The following processes are respectively performed according to the comparison result between the character stored in position W of WTc and the character stored in position P of PTc:

If the character stored in position W of WTc is smaller than the character stored in position P of PTc, then add 1 to position W, and go to step e;

If the character stored in position W of WTp is bigger than the character stored in position P of PTp, then add 1 to position P, and add 1 to practical non-complete number; if the practical non-complete number is smaller or equal to the non-complete number, then go to step e, otherwise, add 1 to the sliding-window position, and go to step c;

If the character stored in position W of WTc is equal to the character stored in position P of PTc, then store the value stored in position W of WTp to array POS in position of the value stored in position P of PTp;

If the value stored in position W of WTp is bigger than the maximum position (MaxP), then store the value stored in position W of WTp to the maximum position (MaxP);

If the value stored in position W of WTp is smaller than the minimum position (MinP), then store the value stored in position W of WTp to the minimum position (MinP); add 1 to position W, add 1 to position P, and go to step e;

Step g, determining whether or not the sliding-window substring satisfies the constraints:

Calculate the practical non-complete number (PNCN) by the equation of PNCN=(PNCN+m−P+1); if PNCN>NCN, then add 1 to the SWP, and go to step C;

Calculate the practical discrete number (PDN) by the equation of PDN=(MaxP−MinP+1−m+PNCN); if PDN>DN, then add 1 to SWP, and go to step C;

Calculate the practical cross number (PCN); if PCN>CN; then add 1 to SWP, and go to step c;

Step h, calculating the similarity:

Similarity=(2m−2×PNCN−PCN)+(2m+PDN−PNCN);

Step i, stopping the matching and return the following results:

Return the similarity, the array POS, the practical discrete number, the practical cross number and the practical non-complete number.

One algorithm for calculating the practical cross number in the above step g is as follows:

Step (1), initialization: array LPOS is supposed to store a maximum interval ascending sequence, and the value at the first position of array LPOS is initialized to −1, LP is used to indicate the position of the array LPOS being processed and is initialized to 1; an end mark is added to the end of array POS, and the first value in array POS is extracted to the comparison data;

Step (2), determining the termination: if the comparison data is an end mark, then go to step (4);

Step (3), loop process: cope with the three conditions by comparison;

If the comparison data is larger than the data at LP position in array LPOS, then LP is increased by 1, and the comparison data is stored in LP position in array LPOS, the next value in array POS is extracted to the comparison data, and go to step (2);

If the comparison data is smaller than the data at LP position in array LPOS, then the bisearch is carried out backward from the first position in array LPOS, and the first data larger or equal to the comparison data is searched out and modified by the comparison data, the next value in array POS is extracted to the comparison data, and go to step (2);

If the comparison data is equal to the data at LP position in array LPOS, then the next value in array POS is extracted to the comparison data, and go to step (2);

Step (4), obtaining the practical cross number: PCN=m−PNCN−LP+1.

The practical cross number calculated in this way is based on character unit.

Another algorithm for calculating the practical cross number is as follows:

Step (1), initialization: set the maximum continuous sequence length to 0, the current continuous sequence length to 1 and the sum of continuous subsequent integers to 0; all the values larger than zero in array POS are stored in a temporary array, and an end mark is added to the end of the temporary array; if the number of nonzero elements in the temporary array is less than 1, then directly return the result of cross number=0; otherwise, array LPOS stores the maximum interval ascending sequence, and the value at the first position of the LPOS is initialized to the first value of the temporary array; LP is used to indicate the position of the array LPOS being processed and is initialized to 1; the second value in the temporary array is extracted to the comparison data;

Step (2), determining the termination: if the comparison data is an end mark, then go to step (5);

Step (3), performing the continuous process: if the comparison data is equal to the data in the prior position after decreasing by 1, then CCSL is increased by 1, the sum of continuous subsequent integers (SCSI) is increased by 1, and go to step (4); otherwise, the larger one of the current continuous sequence length and the maximum continuous sequence length is restored in the maximum continuous sequence length, the current sequence length is 1;

Step (4), coping with the two conditions by comparison

If the comparison data is larger than the data at LP position in array LPOS, then LP is increased by 1; the comparison data is stored in LP position in array LPOS, and the next value in the temporary array is extracted to the comparison data, and go to step (2);

If the comparison data is smaller than the data at LP position in array LPOS, then the bisearch is carried out backward from the first position in array LPOS, and the first data larger than the comparison data is searched out and modified by the comparison data, the next value in the temporary array is extracted to the comparison data, and go to step (2);

Step (5) PCN=m−PNCN−LP−SCSI+Max(MCSL, CCSL)−1, wherein Max is a maximum function.

The practical cross number calculated in this way is based on substring unit.

When the characteristic parameters are set in step A of the example, if the characteristic parameters are set by user, the UI has corresponding value input boxes for the user setting characteristic parameters. The input boxes in the UI are simply the value input boxes or combo boxes, and around each of the value input boxes, the corresponding characteristic parameter name is shown. When the keywords are input in step A, the UI has a text box for the user inputting keywords.

When the characteristic parameters have been set in step A of the example, according to the discrete number, cross number and non-complete number set by the user in the UI or automatically set by the information processing device, the information processing device determines the IR belongs to which one of the eight retrieval modes including the precise retrieval, discrete retrieval, cross retrieval, discrete and cross retrieval, non-complete retrieval, discrete and non-complete retrieval, cross and non-complete retrieval and discrete non-complete retrieval, and provides the retrieval mode name on the UI.

The UI designed according to the method of the example and the retrieval results thereof are described as follows.

According to different data set in the input boxes, the UI presents eight information retrieval mode names and performs eight information retrievals.

1. The first UI example of the precise retrieval mode of the eight information retrieval modes:

PRECISE RETRIEVAL:
Ministry of Information Industry  DISCREET NUMBER
0 CROSS NUMBER 0 NON-COMPLETE NUMBER 0

In this way, the precise retrieval is performed with the keywords provided by user, and is a default mode. The discrete number, cross number and non-complete number are all 0, indicating that the characters in the keywords allow of no discreteness, cross and non-completeness, but should completely present in the retrieved text.

Example of Retrieval:
Text="Ministry of Information Industry, P.R.C." (in Chinese)
Keywords="Ministry of Information Industry" (in Chinese)

The text "Ministry of Information Industry, P.R.C." can be retrieved after matching by the method of the example. And the similarity is: 100%. (Note: bold and underlined characters are matched)

2. The second UI example of the discrete retrieval mode of the eight information retrieval modes:

DISCRETE RETRIEVAL:
[string matching] DISCRETE NUMBER [10] CROSS NUMBER [0] NON-COMPLETE NUMBER [0]

In this way, DN>0, indicating the discrete retrieval is performed with the keywords provided by user, and the retrieved text satisfies the condition that, the characters of the keywords presented in the text allow of no cross and non-completeness, but the number of discrete character is allowed to be smaller or equal to the set discrete number.

Example:
text=" . . . string pattern matching . . . ", set DN=10
keywords="string matching"

The discrete retrieval is performed with the keywords "string matching" by the string matching method of the example, and the text containing "string pattern matching" can be retrieved in bibliographic database. The practical discrete number of this example of matching is 8 characters, where "pattern" is the discrete characters in the text, and the similarity is 79%.

Example:
text=" . . . string pattern matching . . . ", set DN=8
keywords="strg paten machg"

The text containing " . . . string pattern matching . . . " can be also retrieved in bibliographic database by the string matching method of the example. The practical discrete number of this example of matching is 7 characters, where "in" "t" "r" "t" "in" are the discrete characters in the text, and the similarity is 82%.

This example performs the qualitative and quantitative (DN=8) retrieval based on discreteness, which benefits the people who have spell errors. The retrieval words are not necessarily the full words, and the advantage of the string matching based on discreteness is fully exerted.

3. The third UI example of discrete retrieval mode of the eight information retrieval modes:

CROSS RETRIEVAL:
[Pinyin intonation stroke] DISCRETE NUMBER [0] CROSS NUMBER [5] NON-COMPLETE NUMBER [0]

In this way, CN>0, indicating the cross retrieval is performed with the keywords provided by user, and the retrieved text satisfies the condition that, the characters of the keywords presented in the text allow of no discreteness and non-completeness, but the number of cross character is allowed to be smaller or equal to the set cross number.

Example:
text="Pinyin stroke intonation combination input method" (in Chinese)
keywords="Pinyin intonation stroke" (in Chinese)
and set CN=5 (Note: one Chinese character has a length of two characters)

The cross retrieval is performed by the string matching method of the example, and the text "Pinyin stroke intonation combination input method" can be retrieved. In this example of matching, the practical cross number based on character unit is 4, and the practical cross number based on substring unit is 1, where the "stroke" or "intonation" is an cross character. The similarity based on character unit is 83%, and the similarity based on substring unit is 96%.

In a specific embodiment, one of the algorithms for practical cross number is selected according to the retrieval requirement. Generally, the substring is used as calculating unit, which is more practical.

4. The fourth UI example of discrete retrieval mode of the eight information retrieval modes:

DISCRETE AND CROSS RETRIEVAL:
[Pinyin intonation stroke] DISCRETE NUMBER [5] CROSS NUMBER [5] NON-COMPLETE NUMBER [0]

In this way, DN>0 and CN>0, indicating the discrete and cross retrieval is performed with the keywords provided by user, and the retrieved text satisfies the condition that, the characters of the keywords presented in the text allow of no non-completeness, but the discreteness and cross are allowed, where the number of cross character or substring is allowed to be smaller or equal to the set cross number, and the number of discrete character is allowed to be smaller or equal to the set discrete number.

Example:
text="Pinyin, stroke, intonation combination input method" (in Chinese)
keywords="Pinyin intonation stroke" (in Chinese)
and set CN=5, DN=5

The discrete and cross retrieval is performed by the string matching method of the example, and the text "Pinyin, stroke, intonation combination input method" can be retrieved. In this example of matching, the practical cross number based on character unit is 4, and the practical cross number based on substring unit is 1; the practical discrete number is also 4. Wherein the "stroke" or "intonation" is a cross character, and the two symbols "," are discrete characters. The similarity based on character unit is 71%, and the similarity based on substring unit is 82%.

If the discrete number is set to zero, or the cross number is set to zero, the text "Pinyin, stroke, intonation combination input method" cannot be retrieved by keywords "Pinyin intonation stroke".

5. The fifth UI example of discrete retrieval mode of the eight information retrieval modes:

NON-COMPLETE RETRIEVAL:
[Project of Ministry of Information]
[Industry] DISCREET NUMBER [0] CROSS NUMBER [0] NON-COMPLETE NUMBER [5]

In this way, NCN>0, indicating the non-complete retrieval is performed with the keywords provided by user, and the retrieved text satisfies the condition that, the characters of the keywords presented in the text allow of no discreteness and cross, but the non-completeness is allowed, where the number of non-complete character is allowed to be smaller or equal to the set non-complete number.

Example:

text="Project of MII, P.R.C" (in Chinese)

keywords="Project of Ministry of Information Industry" (in Chinese)

and set NCN=5

The non-complete retrieval is performed by the string matching method of the example, and the text "Project of MII, P.R.C" can be retrieved. In this example of matching, the practical non-complete number based on character unit is 4, where the "nformation" and "ndustry" are incompletely matched characters, and the similarity is 83%.

6. The sixth UI example of discrete retrieval mode of the eight information retrieval modes:

DISCRETE AND NON-COMPLETE RETRIEVAL:
Pinyin intonation
stroke DISCRETE NUMBER 4 CROSS NUMBER 0
NON-COMPLETE NUMBER 4

In this way, DN>0 and NCN>0, indicating the discrete and non-complete retrieval is performed with the keywords provided by user, and the retrieved text satisfies the condition that, the characters of the keywords presented in the text allow of no cross, but the discreteness and non-completeness are allowed, where the number of discrete character is allowed to be smaller or equal to the set discrete number, and the number of non-complete character is allowed to be smaller or equal to the set non-complete number.

Example:

text="Pinyin, stroke, combination input method" (in Chinese)

keywords="Pinyin intonation stroke" (in Chinese)

and set DN=4, NCN=4

The discrete and non-complete retrieval is performed by the string matching method of the example, and the text "Pinyin, stroke combination input method" can be retrieved. In this example of matching, the practical discrete number is 2, and the practical non-complete number 4, wherein the symbol "," is a discrete character, and the "intonation" is a non-complete matching character. The similarity is 73%.

7. The seventh UI example of discrete retrieval mode of the eight information retrieval modes:

DISCRETE AND CROSS RETRIEVAL:
Pinyin, stroke DISCRETE NUMBER 0 CROSS NUMBER 4
NON-COMPLETE NUMBER 4

In this way, CN>0 and NCN>0, indicating the cross and non-complete retrieval is performed with the keywords provided by user, and the retrieved text satisfies the condition that, the characters of the keywords presented in the text allow of no discreteness, but the cross and non-completeness are allowed, where the number of cross character or substring is allowed to be smaller or equal to the set cross number, and the number of non-complete character is allowed to be smaller or equal to the set non-complete number.

Example:

text="Pinyin stroke combination input method" (in Chinese)

keywords="Pinyin, okestr" (in Chinese)

and set CN=4, NCN=4.

The cross and non-complete retrieval is performed by the string matching method of the example, and the text "Pinyin stroke combination input method" can be retrieved. In this example of matching, the practical cross number based on character unit is 2, and the practical cross number based on substring unit is 1; the practical non-complete number is 2. Wherein the "str" or "oke" is a cross character, and the symbol "," is a discrete character. The similarity based on character unit is 78%, and the similarity based on substring unit is 83%.

8. The eighth UI example of discrete retrieval mode of the eight information retrieval modes:

DISCRETE, CROSS AND NON-COMPLETE RETRIEVAL:
intonation-pinyin-stroke DISCRETE NUMBER 5
CROSS NUMBER 5 NON-COMPLETE NUMBER 5

In this way, DN>0, CN>0 and NCN>0, indicating the discrete, cross and non-complete retrieval is performed with the keywords provided by user, and the retrieved text satisfies the condition that, the characters of the keywords are presented in the text, where the number of discrete character is allowed to be smaller or equal to the set discrete number, the number of cross character or substring is allowed to be smaller or equal to the set cross number and the number of non-complete character is allowed to be smaller or equal to the set non-complete number.

Example:

Text="Pinyin,stroke,intonation combination input method" (in Chinese)

Keywords="Intonation-Pinyin-stroke" (in Chinese)

and set discrete number=5,cross number=5 and non-complete number=5.

The discrete, cross and non-complete retrieval is performed by the string matching method of the example, and the text "Pinyin, stroke, intonation combination input method" can be retrieved. In this example of matching, the practical discrete number is 4, the matched practical cross number based on character unit is 4, and the practical cross number based on substring unit is 1; the practical non-complete number is 2. Wherein the two symbols "," are discrete characters, and the two symbol "-" are incompletely matched characters. In the example of matching, the similarity based on character unit is 67%, and the similarity based on substring unit is 77%.

The user does not need to set the characteristic parameters in the above information retrieval modes for each time of retrieval, but uses the previous characteristic parameters.

The UI of the above information retrieval modes will automatically adjust the information retrieval mode name when the user modifies any value in the value boxes. Obviously, the rule for determining and displaying the information retrieval mode in the example is as follows:

If DN=0, CN=0 and NCN=0, then it is the discrete retrieval mode; if DN=0, CN>0 and NCN=0, then it is the cross retrieval mode; if DN>0, CN>0 and NCN=0, then it is the discrete and cross retrieval mode; if DN=0, CN=0 and NCN>0, then it is the non-complete retrieval number; if DN>0, CN=0 and NCN>0, then it is the discrete and non-complete retrieval mode; if DN=0, CN>0 and NCN>0, then it is the cross and non-complete retrieval mode; if DN>0, CN>0 and NCN>0, then it is the discrete, cross and non-complete retrieval mode.

As for the determining method and its corresponding input values of this example, the 0 represents "no", whose retrieval constraints are the strictest with a highest precision ratio; the integer larger than 0 represents the retrieval constraint, wherein the bigger the value is, the more relaxed the retrieval constraint is, along with a higher recall ratio. The smaller the value is, the stricter the retrieval constraint is, along with a higher precision ratio. It indicates the information retrieval of different requirements in a simplest and direct way, and the process is the most convenient and effective.

Example 2

The method of this example is basically the same with that of the example 1 with only difference in the procedures of string matching and outputting in step B.

Figure 2:
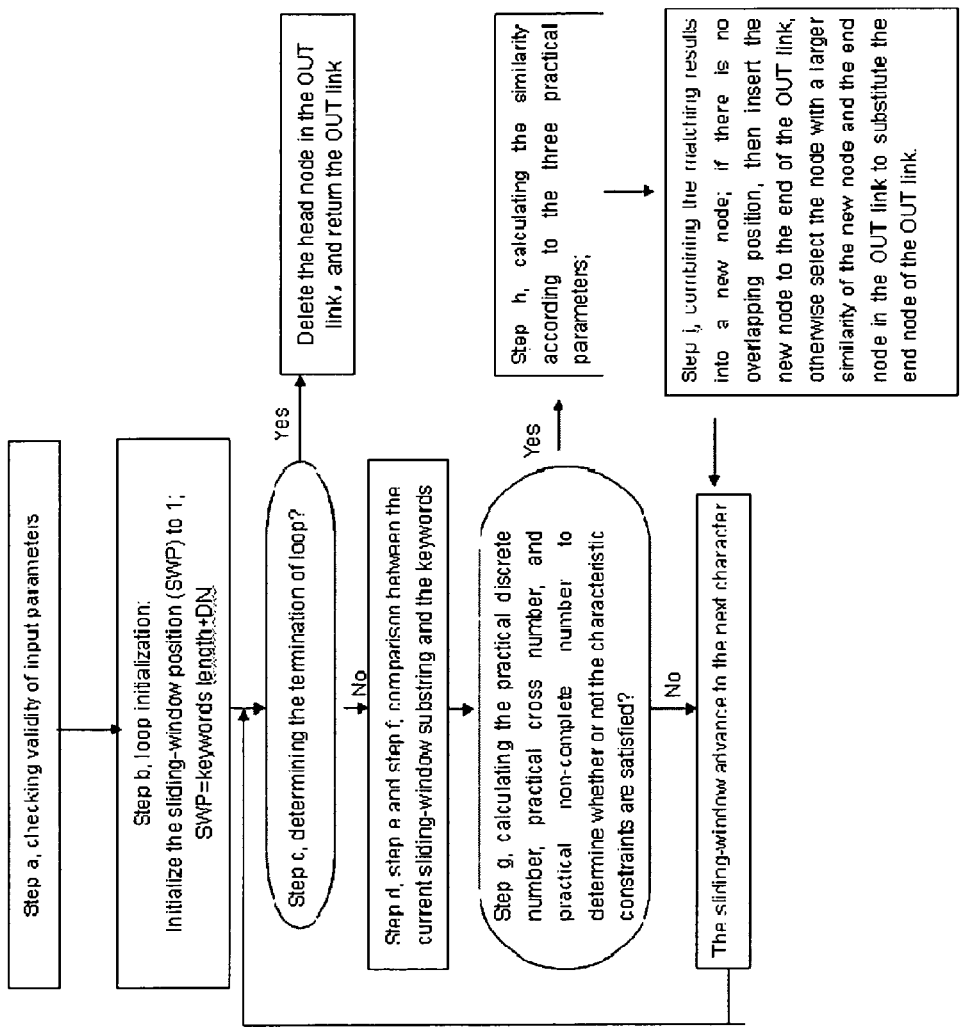
FIG. 2 is a schematic flow for the string matching and outputting in example 2 consistent with the invention.

The flow diagram of FIG. 2 is a schematic flow for string matching and outputting in step B of the example. FIG. 2 illustrates the flow in general: step a, checking validity of input characteristic parameters; step b, loop initialization: initialize the sliding-window position to 1, the sliding-window length=keywords length+DN, initialize an OUT link having a head node; step c, determining the termination of loop, if the loop is terminated, then delete the head node in the OUT link, and return the OUT link, otherwise, implement the following step d, step e and step f, and the current sliding-window substring is compared with the keywords; step g, calculating the practical discrete number, practical cross number, practical non-complete number, and determine whether or not the characteristic constraints are satisfied. If not, then the sliding-window advances to the next character, and go to step c; otherwise, implement step h, calculating the similarity according the three practical characteristic parameters; and step i, combining the matching results into a new node; if there is no overlapping position, then insert the new node to the end of the OUT link, otherwise select the node with a larger similarity of the new node and the end node in the OUT link to substitute the end node of the OUT link; the sliding-window advances to the next character, and go to step c.

The complete procedures of string matching and outputting in step B of the example is as follows:

Step a, checking validity of input parameters:

Calculate length m of the keywords and length n of the text; check validity of the n, m, discrete number, cross number and non-complete number, if invalid, then quit the matching, and return null pointer results; otherwise, the cross number and non-complete number cannot exceed m−1, if exceeding, then altered to m−1;

Step b, loop initialization:

Set an OUT link with a node, which node contains the initial information as follows: MaxP=0, MinP=0 and similarity=1;

Set sliding-window position to 1, indicating the first position to process in the text;

Sort all the characters in keywords $p_1 p_2 \ldots p_m$ in ascending order, and store them in array PT which at the same time stores the original position of each character in the keywords. These two are respectively known as character subarray PTc stored in array PT and position subarray PTp stored in array PT;

From the beginning of the first character in the text, select a substring with a length of min (m+DN−1, n) as a sliding-window substring, add a special symbol smaller than any character ahead of the sliding-window substring, sort the characters in the sliding-window substring in ascending order, and store them in array WT which at the same time stores the original position of each character in the text, with the position of the special symbol being zero. These two are respectively known as character subarray WTc stored in array WT and position subarray WTp stored in array WT; min is a minimum function;

Step c, determining the termination of loop:

If (n−SWP+1+NCN)<m, then delete the head node in the OUT link, quit the matching and return the OUT link;

Step d, proceeding to the parameter initialization for the next sliding-window substring matching:

From the beginning of the sliding-window position, select a substring with a length of min (m+DN, n−SWP+1) as a sliding-window substring, delete the minimum position (MinP) and the corresponding character stored in array WT, and then sort the last character in the sliding-window substring by insertion, which character is inserted in array WT, if (n−SWP+1)<(m+DN), then stop the insertion sort;

Initialize all values in array POS to −1, and practical non-complete number to 0, array WT position W to 1, array PT position P to 1, maximum position (MaxP) to 0 and minimum position (MinP) to n;

Step e, determining whether or not the sliding-window substring matching is over:

If the comparison of array WT or the comparison of array PT is over, then go to step g;

Step f loop comparison between the sliding-window substring and the characters in keywords:

The following processes are respectively performed according to the comparison result between the character stored in position W of WTc and the character stored in position P of PTc:

If the character stored in position W of WTc is smaller than the character stored in position P of PTc, then add 1 to position W, and go to step e;

If the character stored in position W of WTp is bigger than the character stored in position P of PTp, then add 1 to position P, and add 1 to practical non-complete number; if the practical non-complete number is smaller or equal to the non-complete number, then go to step e, otherwise, add 1 to the sliding-window position, and go to step c;

If the character stored in position W of WTc is equal to the character stored in position P of PTc, then store the value stored in position W of WTp to array POS in position of the value stored in position P of PTp;

If the value stored in position W of WTp>maximum position (MaxP), then store the value stored in position W of WTp to maximum position (MaxP); If the value stored in position W of WTp<minimum position (MinP), then store the value stored in position W of WTp to minimum position (MinP); add 1 to position W, add 1 to position P, and go to step e;

Step g, determining whether or not the sliding-window substring satisfies the constraints:

Calculate the practical non-complete number by the equation of PNCN=(PNCN+m−P+1); if PNCN>NCN, then add 1 to SWP, and go to step c;

Calculate the practical discrete number by the equation of PDN=(MaxP−MinP+1−m+PNCN); if PDN>DN, then add 1 to SWP, and go to step c;

Calculate the practical cross number (PCN); if PCN>CN; then add 1 to SWP, and go to step c;

Step h, calculating the similarity:

Similarity=$(2m-2 \times PNCN-PCN) \div (2m+PDN-PNCN)$;

Step i, inserting the matching results to the OUT link:

Add 1 to sliding-window position; combine the similarity, the maximum position, the minimum position, the array POS, the practical discrete number, the practical cross number and the practical non-complete number into a new node;

If the minimum position in the new node is bigger than the maximum position in the end node of the OUT link), then directly insert the new node to the end of the OUT link, and go to step c;

If the minimum position in the new node is smaller or equal to the maximum position in the end node of the OUT link and the similarity of the new node is bigger than the similarity of the end node in the OUT link, then substitute the end node in the OUT link with the new node, and go to step c; otherwise, abandon the new node, and go to step c.

It is probable that a plurality of substrings satisfying the constraints exist in the text in the practical matching, and there might be two overlapping sub-character sequences or a plurality of continuous overlapping sub-character sequences, and mass redundant overlapping information will be generated. In view of that, in the method of this example, only the sub-character sequence in the OUT link with a larger similarity will be output when there are two overlapping sub-character sequences, or a plurality of continuous overlapping sub-character sequences, and the output information is complete and irredundant.

If the returned OUT link is null, it indicates not-matching, otherwise the OUT link contains all the matched sub-character sequences, each containing the matching information such as similarity, maximum position, minimum position, array POS, practical discrete number, practical cross number and non-complete number, etc.

Therefore, besides all the benefits of the algorithm of example 1, the algorithm of this example provides the IR system integrated and detailed matching information for keywords in a specific text, and gives the most complete reference information for the selection of retrieved texts by the information retrieval system.

The following are the practical retrieval examples and the UIs of the method in the example:

DCN retrieval: [pinyin-stroke-intonation] D [5] C [5] N [5]

In the UI of the example, the initial D represents the corresponding word "discrete", the initial C represents the corresponding word "cross", and the initial N represents the corresponding word "non complete".

In this way, DN>0, CN>0 and NCN>0, indicating the discrete, cross and non-complete retrieval is performed with the keywords provided by user, and the retrieved text satisfies the condition that, the characters of the keywords are presented in the text, where the number of discrete character is allowed to be smaller or equal to the set discrete number, the number of cross character or substring is allowed to be smaller or equal to the set cross number and the number of non-complete character is allowed to be smaller or equal to the set non-complete number.

Example:
text="intonation,pinyin,stroke or intonation, pinyin stroke intonation" (in Chinese)
keywords="pinyin-stroke-intonation" (in Chinese)
And set N=5, C=5, D=5

The discrete, cross and non-complete retrieval is performed by the string matching method of the example, and the text "intonation,pinyin,stroke or intonation, pinyin stroke intonation" is retrieved. In the example, there are a plurality of continuous overlapping sub-character sequences satisfying the constraints, and after matching, the OUT link outputs two matched substrings: "pinyin,stroke or intonation" and "pinyin stroke intonation", which are not overlapping.

The first node in the OUT link contains the first matching substring "pinyin,stroke or intonation" and its relevant information: the practical discrete number of the substring is 4, the practical cross number is 0 and the practical non-complete number is 2, wherein "," and "or" are discrete characters, and two "-" symbols are incompletely matched characters, and the similarity is 80%.

The second node in the OUT link contains the second matching "pinyin stroke intonation" and its relevant information: the practical discrete number is 0, the practical cross number is 0 and the practical non-complete number is 2, wherein two "-" symbols are incompletely matched characters, and the similarity is 92%.

When setting the characteristic parameters and inputting the retrieval words in step A of the embodiment of the invention, the UI can be a partial combination of the three characteristic parameters input boxes, or even has no input boxes, that is, part of or all the characteristic parameters are automatically set by the information processing device rather than the user, forming the UI consisting of less than three or no characteristic parameters. At this time, the characteristic parameters not presented in the UI are defaults automatically set by the information processing device on the basis of special uses. The combination of characteristic parameters in the UI can realize a retrieval mode with parameters automatically set, which is suitable for special applications and environments and reduces the number of characteristic parameters to set by the user. With convenient operation, the user only inputs the keywords and the less characteristic parameters.

For instance, the non-complete number is automatically set to 0 by the information processing device rather than the user, and the discrete and cross number on the UI are set by the user. This UI has only two characteristic parameters of discrete number and cross number, and the user can select 4 information retrieval modes including precise mode, discrete mode, cross mode and discrete and cross mode, which are as follows:

X retrieval: [        ] D □ C [2]

wherein "X"="precise", "discrete", "cross" or "discrete and cross".

For another instance, the non-complete number and cross number are automatically set to 0 by the information processing device rather than the user, and the discrete number on the UI is set by the user. This UI has only the discrete number, and the user can select 2 information retrieval modes including precise mode and discrete mode, which are as follows:

X retrieval: [        ] D □ wherein "X"="precise" or "discrete".

For yet another instance, the non-complete number is automatically set to an integer rounded up with m/10 by the information processing device, wherein m is the length of the keywords; the cross number is automatically set to an integer rounded up with m/5 by the information processing device;

the discrete number on the UI is set by the user. This UI has 6 information retrieval modes according to the discrete number, cross number and non-complete number. And the UI is as follows:

Wherein "AUTO" also belongs to one selection of the characteristic parameters; where "X" is one of the following 6 information retrieval names:

When the input keywords have a length smaller or equal to 2, figure out the non-complete number is 0 and the cross number is 0. If the user sets the discrete number to 0, then perform the precise retrieval; if the user sets the discrete number to 3, then perform the discrete retrieval.

When the input keywords have a length of 4, figure out the non-complete number is 0 and the cross number is 1. If the user sets the discrete number to 0, then perform the cross retrieval; if the user sets the discrete number to 5, then perform the discrete and cross retrieval.

When the input keywords have a length bigger or equal to 5, figure out the non-complete number is equal or bigger than 1 and the cross number is equal or bigger than 1. If the user sets the discrete number to 0, then perform the non-complete retrieval; if the user sets the discrete number=5, then perform the discrete and non-complete retrieval.

The way in which the information processing device automatically sets the cross number and the non-complete number, realizes such an information retrieval operation that, the longer the keywords are, the bigger the cross number and non-complete number set by the information processing device are, along with more cross and non-complete characters allowed in retrieval matching; the shorter the keywords are, the smaller the cross number and non-complete number set by the information processing device are, along with fewer cross and non-complete characters allowed in retrieval matching. This automatically setting manner better ensures the quality of the retrieved text.

The process in which the information processing device automatically sets the parameters is consistent with the common operation habit and requirements, like the operation of an automatic camera or an automatic transmission car; while the operation that the user selectively sets the parameters is like the operation of a manual camera or a manual transmission car.

The name of characteristic parameters and information retrieval mode in the UI can be substituted by other symbols in specific embodiments.

Consistent with the invention, the string matching methods, value input boxes and values used for information retrieval affect the retrieval performance, retrieval mode and retrieval constraints, correspondingly.

The invention fully considers the expanding of the function of information retrieval and the operation requirements for information retrieval by the user, and realizes a novel information retrieval operation, that is, the user arbitrarily selects the value box for the three characteristic parameters, and inputs different values to choose one of the eight retrieval modes and perform the information retrieval of different characteristics and different constraints. The operation of the invention is simple, flexible and convenient, and various measures can functionally ensure the recall ratio, precision ratio and setting accuracy. The qualitative and quantitative retrievals, error-tolerant retrieval and retrieval with parameters automatically set can be performed.

The method for string matching based on the three characteristics consistent with the invention is applied to the information retrieval field, such as internet information search of multiple languages, site retrieval, database retrieval, document retrieval, electric dictionary, data query, information input and retrieval of file names in operating system, etc. In addition, the invention can be applied to the biotechnology field. For example, the method for string matching based on the characteristics is also applicable to DNA matching, the major subject in current genetics research with its flexible, convenient and various matching modes, both qualitative and quantitative.

What is claimed is:

1. A method for performing characteristic string matching based on discreteness, cross and non-completeness on an information processing device, comprising the steps of:

Step A: setting characteristic parameters and inputting keywords, wherein a user sets three characteristic parameters in a User Interface (UI) or an information processing device automatically sets:

a discrete number reflecting discreteness, wherein the discreteness is a number of discrete characters in the keywords presented in a text;

a cross number reflecting a cross parameter, wherein the cross parameter is a number of cross characters or substrings in the keywords presented in the text; and a non-complete number reflecting a non-completeness, wherein the non-completeness is a number of characters in the keywords not presented in the text; and inputting keywords in the UI;

Step B: string matching and outputting, wherein the information processing device performs the string matching based on the three characteristic parameters, with the discrete number, cross number and non-complete number set in step A as matching constraints, for a designated text according to the input keywords, and if a calculated practical discrete number, practical cross number and practical non-complete number satisfy the matching constraints, then the information processing device outputs a matching result of one of eight retrieval modes combined by the three characteristic parameters.

2. The method according to claim 1, characterized in that the string matching and outputting in said step B comprises the steps of:

Step a: checking validity of input parameters:

Calculate length m of the keywords and length n of the text; check validity of n, m, discrete number (DN), cross number (CN) and non-complete number (NCN): if invalid, then quit the matching, and return the unmatched results; otherwise, the cross number and non-complete number cannot exceed m−1, if exceeding, then alter to m−1;

Step b: loop initialization:

Set the sliding-window position (SWP) to 1, indicating the first position to process in the text;

Sort all characters in keywords (p1, p2, . . . pm) in ascending order and store the characters in an array PT known as a character subarray PTc stored in the array PT, and at the same time store the original position of each character in the keywords in an array known as the position subarray PTp stored in the array PT;

From the beginning of the first character in the text, select a substring with a length of min (m+DN−1, n) as a sliding-window substring, add a special symbol smaller than any character ahead of the sliding-window substring, sort the characters in the sliding-window substring in ascending order, and store the characters in an array WT known as a character subarray WTc stored in the array WT, and at the same time store the original position of each character in the text in a position subarray WTp stored in the array WT, with the position of the special symbol being zero; min being a minimum function;

Step c: determining the termination of loop:
  If (n−SWP+NCN)<m, then stop the process, and return the unmatched results;

Step d: proceeding to the parameter initialization for the next sliding-window substring matching:
  From the beginning of the sliding-window position, select a substring with a length of min (m+DN−1, n) as a sliding-window substring, delete a minimum position (MinP) and the corresponding character stored in array WT, and then sort an end character in the sliding-window substring by insertion, which character is inserted in array WT, if (n−SWP+1)<(m+DN), then stop the insertion sort;
  Initialize all the values in an array POS to −1, practical non-complete number to 0, array WT position W to 1, array PT position P to 1, maximum position (MaxP) to 0 and minimum position (MinP) to n;

Step e: determining whether or not the sliding-window substring matching is over:
  If the comparison of array WT or the comparison of array PT is over, then go to step g;

Step f: loop comparison between the sliding-window substring and the characters in the keywords:
  Respectively perform the following processes according to the comparison result between the character stored in position W of WTc and the character stored in position P of PTc:
  If the character stored in position W of WTc is smaller than the character stored in position P of PTc, then add 1 to position W, and go to step e;
  If the character stored in position W of WTp is bigger than the character stored in position P of PTp, then add 1 to position P, and add 1 to the practical non-complete number; if the practical non-complete number is smaller or equal to the non-complete number, then go to step e, otherwise, add 1 to the sliding-window position, and go to step c;
  If the character stored in position W of WTc is equal to the character stored in position P of PTc, then store the value stored in position W of WTp to array POS in the position of the value stored in position P of PTp;
  If the value stored in position W of WTp is bigger than the maximum position (MaxP), then store the value stored in position W of WTp to the maximum position (MaxP);
  If the value stored in position W of WTp is smaller than the minimum position (MinP), then store the value stored in position W of WTp to the minimum position (MinP); add 1 to position W, add 1 to position (Pp), and go to step e;

Step g: determining whether or not the sliding-window substring satisfies the constraints:
  Calculate the practical non-complete number (PNCN) by the equation of PNCN=(PNCN+m−P+1); if PNCN>NCN, then add 1 to the SWP, and go to step c;
  Calculate the practical discrete number (PDN) by the equation of PDN=(MaxP−MinP+1−m+PNCN); if PDN>DN, then add 1 to SWP, and go to step c;
  Calculate the practical cross number (PCN); if PCN>CN; then add 1 to SWP, and go to step c;

Step h: calculating similarity:

Similarity=(2m−2×PNCN−PCN)÷(2m+PDN−PNCN);

Step i: stopping the matching and returning the following results:
  Return the similarity, the array POS, the practical discrete number, the practical cross number and the practical non-complete number.

3. The method according to claim 1, characterized in that the string matching and outputting in said step B further comprises the steps of:

Step a: checking validity of input parameters:
  Calculate length m of the keywords and length n of the text; check validity of the n, m, discrete number (DN), cross number (CN) and non-complete number (NCN), if invalid, then quit the matching, and return null pointer results; otherwise, the cross number and non-complete number cannot exceed m−1, if exceeding, then alter to m−1;

Step b: loop initialization:
  Set an OUT link with a node, which node contains the initial information as follows: maximum position MaxP=O, minimum position MinP=O and a similarity=1;
  Set sliding-window position (SWP) to 1, indicating the first position to process in the text;
  Sort all the characters in keywords (p1, p2, . . . pm) in ascending order, and store them in the array PT known as character subarray PTc stored in the array PT and at the same time store the original position of each character in the keywords in an array known as position subarray PTp stored in the array PT;
  From the beginning of the first character in the text, select a substring with a length of min (m+DN−1, n) as a sliding-window substring, add a special symbol smaller than any character ahead of the sliding-window substring, sort the characters in the sliding-window substring in ascending order, and store them in array WT which at the same time stores the original position of each character in the text, with the position of the special symbol being zero, these two being respectively known as character subarray WTc stored in array WT and position subarray WTp stored in array WT; min is a minimum function;

Step c: determining termination of loop:
  If (n−SWP+1+NCN)<m, then delete a head node in the OUT link, quit the matching and return the OUT link;

Step d: proceeding to the parameter initialization for the next sliding-window substring matching:
  From the beginning of the sliding-window position, select a substring with a length of min (m+DN, n−SWP+1) as a sliding-window substring, delete the minimum position (MinP) and the corresponding character stored in array WT, and then sort the last character in the sliding-window substring by insertion, which character is inserted in array WT, if (n−SWP+1)<(m+DN), then stop the insertion sort;
  Initialize all values in array POS to −1, and initialize practical non-complete number (PNCN) to 0, array WT position W to 1, array PT position (Pp) to 1, maximum position (MaxP) to 0 and minimum position (MinP) to n;

Step e: determining whether or not the sliding-window substring matching is over:
  If the comparison of array WT or the comparison of array PT is over, then go to step g;

Step f: loop comparison between the sliding-window substring and the characters in keywords:
Respectively perform the following processes according to the comparison result between the character stored in position W of WTc and the character stored in position P of PTc:
If the character stored in position W of WTc is smaller than the character stored in position P of PTc, then add 1 to position W, and go to step e;
If the character stored in position W of WTp is bigger than the character stored in position P of PTp, then add 1 to position P, and add 1 to the practical non-complete number; if the practical non-complete number is smaller or equal to the non-complete number, then go to step e, otherwise, add 1 to the sliding-window position, and go to step c;
If the character stored in position W of WTc is equal to the character stored in position P of PTc, then store the value stored in position W of WTp to array POS in the position of the value stored in position P of PTp;
If the value stored in position W of WTp>maximum position (MaxP), then store the value stored in position W of WTp to maximum position (MaxP);
If the value stored in position W of WTp<minimum position (MinP), then store the value stored in position W of WTp to minimum position (MinP); add 1 to position W, add 1 to position (Pp), and go to step e;
Step g: determining whether or not the sliding-window substring satisfies the constraints:
Calculate the practical non-complete number by the equation of PNCN=(PNCN+m−Pp−1); if PNCN>NCN, then add 1 to SWP, and go to step c;
Calculate the practical discrete number (PDN) by the equation of PDN=(MaxP−MinP+1−m+PNCN); if PDN>DN, then add 1 to SWP, and go to step c;
Calculate the practical cross number (PCN); if PCN>CN, then add 1 to SWP, and go to step c;
Step h: calculating similarity:

Similarity=(2m−2×PNCN−PCN)+(2m+PDN−PNCN);

Step i: inserting matching results to the OUT link:
Add 1 to the sliding-window position; combine the similarity, the maximum position, the minimum position, the array POS, the practical discrete number, the practical cross number and the practical non-complete number into a new node;
If a minimum position in the new node is bigger than a maximum position in an end node of the OUT link, then directly insert the new node to the end node of the OUT link, and go to step c;
If the minimum position in the new node is smaller or equal to the maximum position in the end node of the OUT link and the similarity of the new node is bigger than the similarity of the end node in the OUT link, then substitute the end node in the OUT link with the new node, and go to step c; otherwise, abandon the new node, and go to step c.

4. The method according to claim 2 or 3, characterized in that an algorithm for calculating the practical cross number in the above step g is as follows:
Step (1) initialization: an array LPOS is configured to store a maximum interval ascending sequence, and the value at a first position of array LPOS is initialized to −1, LP indicates the position of the array LPOS being processed and is initialized to 1; an end mark is added to the end of array POS, and the first value in array POS is extracted to comparison data;
Step (2) determining termination: if the comparison data is an end mark, then go to step (4);
Step (3) loop process: cope with three conditions by comparison;
If the comparison data is larger than the data at LP position in array LPOS, then LP is increased by 1, and the comparison data is stored at the LP position in array LPOS, the next value in array POS is extracted to the comparison data, and go to step (2);
If the comparison data is smaller than the data at LP position in array LPOS, then a bisearch is carried out backward from the first position in array LPOS, and first data larger or equal to the comparison data is searched out and modified by the comparison data, the next value in array POS is extracted to the comparison data, and go to step (2);
If the comparison data is equal to the data at LP position in array LPOS, then the next value in array POS is extracted to the comparison data, and go to step (2);
Step (4) obtaining the practical cross number: PCN=m−PNCN−LP+1.

5. The method according to claim 2 or 3, characterized in that another algorithm for calculating the practical cross number in the above step g is as follows:
Step (1) initialization: set a maximum continuous sequence length (MCSL) to 0, a current continuous sequence length (CCSL) to 1 and a sum of continuous subsequent integers (SCSI) to 0; store all values in array POS larger than zero in a temporary array in turn, and add an end mark to the end of the temporary array; if the number of nonzero elements in the temporary array is less than 1, then directly return the result of cross number=0; otherwise, store a maximum interval ascending sequence in array LPOS, and initialize the value at first position of the array LPOS to a first value of the temporary array; initialize LP to 1 and use LP to indicate the position of the array LPOS being processed; extract the second value in the temporary array to the comparison data;
Step (2), determining termination: if the comparison data is an end mark, then go to step (5);
Step (3), performing a continuous process: if the comparison data is equal to the data in the prior position after decreasing by 1, then CCSL is increased by 1, the sum of continuous subsequent integers (SCSI) is increased by 1, and go to step (4); otherwise, the larger one of the current continuous sequence length and the maximum continuous sequence length is restored in the maximum continuous sequence length, and the current continuous sequence length is 1;
Step (4), coping with two conditions by comparison:
If the comparison data is larger than the data at position LP in array LPOS, then LP is increased by 1; the comparison data is stored at the LP position in array LPOS, and the next value in the temporary array is extracted to the comparison data, and go to step (2);
If the comparison data is smaller than the data at position LP in array LPOS, then a bisearch is carried out backward from the first position in array LPOS, and a first data larger than the comparison data is searched out and modified by the comparison data, the next value in the temporary array is extracted to the comparison data, and go to step (2);
Step (5), calculating PCN=m−PNCN−LP−SCSI+Max (MCSL, CCSL)−1, wherein Max is a maximum function.

6. The method according to claim 1, characterized in that when the characteristic parameters are set in step A, the UI is configured to have corresponding value input boxes for setting user characteristic parameters when the characteristic parameters are set by the user.

7. The method according to claim 6, characterized in that said input boxes in the UI are value input boxes or combo boxes, and at each of the value input boxes, the corresponding characteristic parameter name is shown.

8. The method according to claim 1, characterized in that when the keywords are input in the above step A, the UI has a text box for the user inputting the keywords.

9. The method according to any one of claims 1 to 8, characterized in that when the characteristic parameters have been set in step A, according to the discrete number, cross number and non-complete number set in the UI or automatically set by the information processing device, the information processing device determines information retrieved belongs to one of the eight retrieval modes including the precise retrieval, discrete retrieval, cross retrieval, discrete and cross retrieval, non-complete retrieval, discrete and non-complete retrieval, cross and non-complete retrieval and discrete non-complete retrieval, and provides the retrieval mode name on the UI.

10. A method for performing, on an information processing device, characteristic string matching based on discreteness, cross and non-completeness, the method comprising the steps of:
   Step A: receiving characteristic parameters and keywords, comprising configuring a User Interface (UI) to receive, or configuring the information processing device to automatically set, three characteristic parameters:
   a discrete number reflecting discreteness, wherein the discreteness is a number of discrete characters in the keywords presented in a text;
   a cross number reflecting a cross parameter, wherein the cross parameter is a number of cross characters or substrings in the keywords presented in the text; and
   a non-complete number reflecting a non-completeness, wherein the non-completeness is a number of characters in the keywords not presented in the text;
   configuring a UI to receive keywords;
   Step B: string matching and outputting, comprising configuring the information processing device to:
   perform string matching based on the three characteristic parameters, with the discrete number, cross number and non-complete number of step A as matching constraints, for a designated text according to the keywords;
   calculate a practical discrete number, a practical cross number, and a practical non-complete number; and
   output the matching result of one of eight constraint modes combined by the three characteristic parameters if the calculated practical discrete number, practical cross number, and practical non-complete number satisfy the matching constraints.

* * * * *